L. H. BRINKMAN.
APPARATUS FOR FLANGING PIPES.
APPLICATION FILED MAR. 29, 1917.
1,298,656.
Patented Apr. 1, 1919.
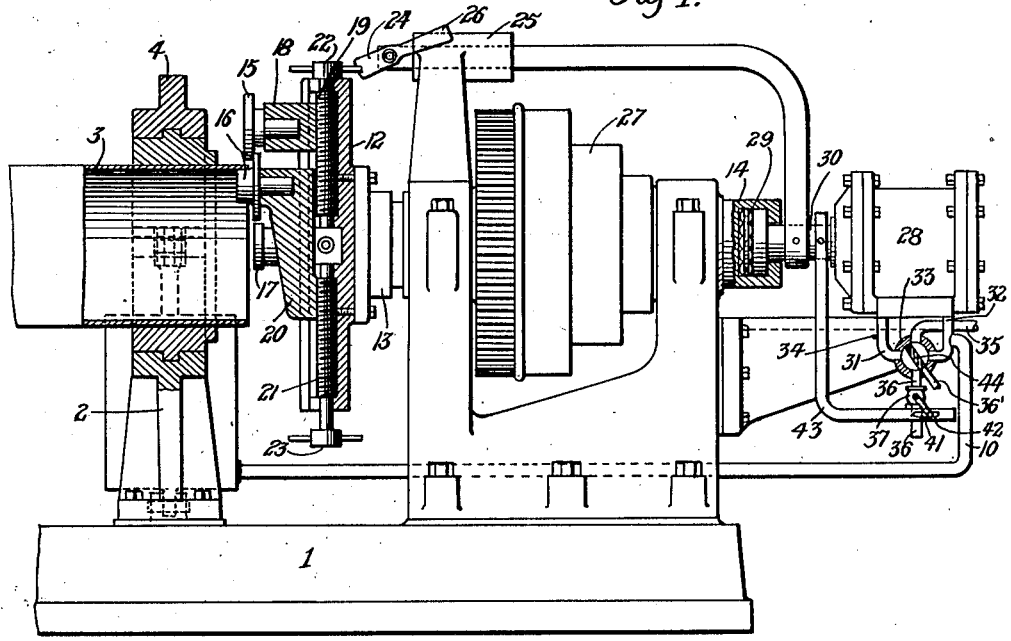

UNITED STATES PATENT OFFICE.

LOUIS H. BRINKMAN, OF GLEN RIDGE, NEW JERSEY.

APPARATUS FOR FLANGING PIPES.

1,298,656.  Specification of Letters Patent.  Patented Apr. 1, 1919.

Application filed March 29, 1917. Serial No. 158,169.

*To all whom it may concern:*

Be it known that I, LOUIS H. BRINKMAN, a citizen of the United States, residing at town of Glen Ridge, county of Essex, State of New Jersey, have invented new and useful Improvements in Apparatus for Flanging Pipes, of which the following is a specification.

This invention relates to means for forming flanges on pipes.

The present invention is an improvement upon the apparatus of my application Serial Number 131,374, filed November 15th, 1916.

One object of the invention is to provide means for operating the clamp for holding the pipe, which shall insure prompt and positive operation; another object is to provide clamp operating means which is flexible in its control so that it may be controlled from any desired point.

A further object of the invention is to provide means for automatically controlling the relative movement of the flanging means and pipe. The flanging operation may then be accomplished without close care on the part of the operator.

A further object of the invention is to so relate the clamp operating means and the means for operating the flanging means that, a pipe having been placed in position, it may be clamped and the flanging operation got under way without delay. This is of especial importance with heated pipes as if there is undue delay, the pipe will cool down.

Other and ancillary objects of the invention will appear hereinafter.

In the accompanying drawings, which illustrate the invention,

Figure 1 is a side elevation of sufficient of the flanging machine to show the application of the present invention thereto, with some of the parts in section;

Fig. 2 is an end view of the apparatus of Fig. 1 looking from the left; and

Fig. 3 is a sectional view of an exhaust controlling valve.

Referring to the drawings, the apparatus comprises a base 1, on which is mounted a support 2 for the pipe 3 to be flanged. The upper portion of the support 2 forms the lower portion of the pipe securing clamp, the upper portion 4 of the clamp being hinged thereto at 5, so that the portion 4 can be swung upwardly to permit the insertion or withdrawal of the pipe and which, when forced downwardly against the pipe, securely clamps it in position. From the clamp 4, extends a tail piece or arm 6 beyond the pivot 5, to which is pivoted a piston rod 7, connected to the piston 8 in a hydraulic cylinder 9, having the pipe connection 10 at or near the bottom of the cylinder. The cylinder is pivotally supported at 11 on the base plate.

The flanging apparatus comprises a chuck having a plate 12 bolted to a flange 13 fixed to the driving shaft 14. This chuck carries the upsetting roll 15, the flanging roll 16 and the sizing roll 17 and also a facing roll not shown herein. The upsetting roll is rotatively mounted in the head 18, which is movable radially of the chuck in suitable guides by means of a screw 19, engaging with the block 18, the screw being rotatably mounted, but prevented from moving endwise. The flanging roll 16 is rotatably mounted in a radial line with the upsetting roll in the block 20, movable radially of the clutch in suitable guides by means of the screw 21 which engages with the block. This screw is also rotatably mounted but secured against endwise movement. The sizing roll 17 is mounted on a cross head which is radially adjustable in the chuck by means of a screw, in a manner similar to the mounting and adjustment of the upsetting roll 15, the screw and cross head on which the roll 17 are mounted, however, being on a radius at right angles to the screw 19. The outer ends of the screws 19 and 21 are provided with turnstile heads 22 and 23, the cross-bars of which may engage a tappet 24 which is pivotally mounted upon the end of a bar sliding in the support 25. By means of the handle 26, the tappet may be rocked on its pivot so as to be moved into the paths of the turnstile arms or removed therefrom at will. This arrangement provides for the automatic adjustment of the upsetting and flanging rolls during the operation of the machine. The chuck may be rotated from a cone pulley 27, which is splined on the shaft 14 so that it rotates with the shaft, but the latter may be slid axially through the pulley. This permits the chuck to be moved upon the axis along the pipe by a hydraulic cylinder 28. An endwise thrust is imparted to the shaft 14 by means of a thrust coupling 29, which permits relative rotation of the shaft and piston rod 30 of the hydraulic cylinder. Pipes 31 and 32 communicate with the ends of the cylinder respectively on the two sides of the piston to which the piston rod 30 is secured. The other ends of these pipes communicate with the valve casing 33 and the pipe 31 is also provided with a small outlet or bleed opening at 34. A pipe 35 leads from the valve casing to a source of hydraulic pressure. An exhaust pipe 36 also communicates with the valve casing and is controlled by a valve 37. Another exhaust pipe is shown at 36'. By referring to Fig. 3, it will be seen that the valve 37 comprises a casing 38 housing a rotatable member 39 containing a passage 40, which may be moved into and out of registry with the sections of the pipe 36, which are secured to the valve casing. The valve member 39 has secured to it an arm 41 for turning it, this arm having its end engaging in a slot 42 in the arm 43 fixed upon the piston rod 30, so that it moves back and forth with the flanging apparatus. The slot, as mentioned, is of such length that it permits movement of the flanging apparatus without operating the valve until such a point is reached in the movement of that apparatus that it is desired to operate the valve. It will be seen that this valve closes the main exhaust passage so that with the parts in the position as shown, the only exhaust from the hydraulic cylinder 28 can take place through the bleed orifice 34, thereby permitting the flanging apparatus to be moved toward the pipe at a slow speed. It is, therefore, desired to keep the valve 37 closed during a considerable movement of the flanging apparatus, and therefore it will be observed that after the valve 37 has been closed, the valve will remain in this condition during a considerable movement of the flanging means.

In the position shown, the valve 44 in the casing 33 is in such position that the pipe 31 is connected with the exhaust pipe 36, while the pipe 32 is connected with the supply pipe 35. The pipe 10 being connected with the pipe 32, is also in communication with the supply pipe 35 from the fluid pressure source. The exhaust opening 36' is covered by the valve 44 in this position. The valve 44 may be hand operated and of any well known or suitable structure. The valve 39 is in open position as shown in Fig. 3. The conditions being as described, pressure is exerted beneath the piston 8 of the clamp operating cylinder, thereby forcing it up and forcing the clamp into closed position as shown in Fig. 2; also the portion of the cylinder 28 at the left as viewed in Fig. 1, is connected with the exhaust connection 36, which is fully open, while the portion of the cylinder 28 at the right is in connection with the source of fluid pressure. The piston rod 30 and shaft 14 with the flanging apparatus has, under this pressure, been forced to the left (Fig. 1) and the flanging apparatus is about to begin its action upon the pipe. A further slight movement therefore, to the left, will operate to close the valve 37, thereby closing the main exhaust. The only exhaust from the left end of the cylinder 28, will then be through the bleed orifice 34, which will only permit the flanging apparatus to be moved slowly to the left during the operation of the flanging means upon the pipe. The flanging operation having been performed to the desired extent, the operator may turn the valve 44 so that it will be in a position substantially at right angles to that shown in the drawing. The pipe 31 will then be placed in communication with the pressure supply, while the pipes 32 and 10 will be placed in communication with the exhaust 36'. The piston of the cylinder at 28 will thus be moved to the right hand end of its movement, the flanging apparatus being retracted from the end of the pipe. During this movement, the valve 37 will be opened. Also the effect of the connection of the pipe 10 with the exhaust, is to exhaust the pressure from beneath the piston 8 of the clamp operating cylinder. The piston will then drop, lifting the upper half 4 of the clamp so that the pipe is released. Should the weight of the piston and connecting parts be insufficient to overbalance the clamp portion 4, so as to raise it, weights may be applied for this purpose. The clamp having been opened, the pipe may be removed and the flanging apparatus is in retracted position. The flanged pipe may be then removed. Another pipe to be operated upon, may be placed in position and the valve 44 thrown by the operator into the position as shown in the drawings. The valve 37 being open, the piston will quickly move to the left carrying the flanging apparatus with it up to the point where the action on the pipe is about to be begun. At this point the valve 37 will be closed and the piston slowed down for the balance of the stroke because the bleed taking place at the orifice 34, is the only exhaust. With this slow movement, the flanging of the pipe will be effected when the operator can again throw the valve 44 into releasing position, thereby releasing the flanged pipe and retracting the flanging apparatus. The operation may thus be continued indefinitely to flange any number of pipes desired.

While the invention has been illustrated in what has been considered its best application, it may have other embodiments without departing from its spirit and is not therefore, limited to the structures shown in the drawings.

What I claim is:—

1. In pipe flanging apparatus, the combination with a support for the pipe of a chuck carrying rolls for forming a flange on the pipe, said chuck being movable longitudinally with relation to said support, and means controlled by the relative positions of said chuck and pipe support for relatively moving the chuck and support.

2. In a pipe flanging apparatus, the combination with means for supporting the pipe, of a chuck carrying rolls for forming a flange on said pipe, means for moving said chuck toward said support, means for controlling said moving means and means moving proportionately to said chuck for actuating said controlling means.

3. In a pipe flanging apparatus, the combination with a pipe support, of means for flanging the pipe, a fluid pressure cylinder and piston for relatively moving the flanging means and support, a pressure fluid supply connection for said cylinder, an exhaust connection for said cylinder, valve mechanism for controlling the supply and exhaust to and from said cylinder, and means moving with one of the moving parts for controlling the exhaust.

4. In pipe flanging apparatus, the combination with a pipe support of flanging means for operating upon the pipe, a fluid pressure cylinder and piston for moving the said flanging means with relation to the pipe, a fluid supply connection for said cylinder, an exhaust connection for said cylinder, said exhaust comprising a main exhaust and a restricted exhaust or bleed, a valve controlling the main exhaust, and means actuated by one of the moving parts for operating said valve.

5. In pipe flanging apparatus, the combination with a pipe support comprising a clamp operable to secure the pipe, flanging means for operating upon the pipe, means for operating the clamp, means for moving the flanging means and means for simultaneously controlling the clamp operating and the flanging apparatus moving means.

6. In pipe flanging apparatus, the combination with a pipe support comprising a clamp operable to secure the pipe, flanging means for operating upon the pipe, means for operating the clamp, means for moving the flanging means and common means for controlling the clamp operating and the flanging apparatus moving means.

7. In a pipe flanging apparatus, the combination with a pipe support comprising a clamp, of fluid pressure means for operating said clamp, flanging means for operating upon said pipe, fluid pressure means for moving said flanging means and pipe toward each other, a valve mechanism operating to control in common the clamp operating fluid pressure means and the fluid pressure means for operating the flanging means.

8. In a pipe flanging apparatus, the combination with a pipe support comprising a clamp, of a fluid pressure clamp operating means, flanging means for operating upon the pipe, a fluid pressure operated cylinder and piston for moving said flanging means against said pipe, fluid supply connections for said cylinder, exhaust connections for said cylinder, said exhaust connections comprising a main exhaust and a restricted exhaust or bleed, and valve mechanism controlling in common the fluid connections and exhausts of the clamp operating fluid pressure means and the fluid pressure means for operating the flanging means, a valve controlling the said main exhaust and means moving with the said flanging means and engaging with the last mentioned valve to actuate it.

In testimony whereof I have signed this specification this 27th day of March, 1917.

LOUIS H. BRINKMAN.